Dec. 2, 1947.  L. A. SCOTT  2,431,711
DESK CONVERTIBLE INTO CARRYING CASES
Filed Aug. 31, 1943  2 Sheets-Sheet 1

L. ALLEN SCOTT
INVENTOR.

BY
ATTORNEY

Dec. 2, 1947. L. A. SCOTT 2,431,711
DESK CONVERTIBLE INTO CARRYING CASES
Filed Aug. 31, 1943 2 Sheets-Sheet 2

L. ALLEN SCOTT
INVENTOR.

BY
ATTORNEY

Patented Dec. 2, 1947

2,431,711

UNITED STATES PATENT OFFICE 2,431,711

DESK CONVERTIBLE INTO CARRYING CASES

Lester A. Scott, Wheatridge, Colo., assignor to himself and Nancy Dubois Scott, Denver, Colo., as joint tenants Application August 31, 1943, Serial No. 500,621

4 Claims. (Cl. 312—2)

This invention relates to transportable work equipment, and more particularly to such equipment which is readily convertible into a desk, camp kitchen, or the like, at any place desired by a camping party, army unit, or the like.

Particularly when in the open field or at a considerable distance from habitation, it is desirable that a camping party, army unit, or the like, be able to quickly set up desks for necessary paper work or field operations, or a table or cabinet for use in the preparation and serving of meals. When a group of soldiers are to be fed, for instance, there is usually no time for carpenters to build even temporary work benches or tables. In addition, it is desirable that the equipment used in culinary, clerical, or similar work, be carried in a manner so as to be readily accessible when a desk, camp kitchen, etc., is set up.

Among the objects of this invention are to provide transportable work equipment which serves serves as a container or carrier for the culinary or clerical equipment; to provide such equipment which may be converted into a cabinet-like structure having sufficient shelf and working space to permit the necessary operations to be carried out; to provide such work equipment which may be readily shipped and occupies a relatively small space during transportation from one point to another; to provide such work equipment which is easily set up; to provide such work equipment which may be used as a kitchen cabinet, as a field desk, or for any other desired purpose; to provide such work equipment which may be set up on uneven ground or placed on an uneven support; to provide such work equipment which is particularly adapted to be transported on an animal, the hood of an automobile, or other curved portion of a carrier; to provide such work equipment which is readily disassembled and packed for shipment; and to provide such work equipment which is relatively simple and cheap in construction, and also light in weight.

Other objects and novel features of this invention will become apparent from the following description and accompanying drawings, in which.

Transportable work equipment constructed in accordance with this invention may comprise two or more boxes or box-like structures, one wall of each of the boxes being removable. Another wall of each box is provided with connecting elements, and the removable wall with cooperating connecting elements, so constructed and arranged that the removable wall may be attached to the boxes to extend therebetween and form a shelf or the like. This shelf may be a continuation of the top of each box to provide an enlarged working space, and two or more shelves may be provided, one above the other, to provide storage space for culinary, clerical, or other equipment. In addition, three or more of the boxes may be placed in alined, spaced apart relationship, with a removable wall connecting each pair of adjacent boxes to provide a more extended working space.

Figure 1:
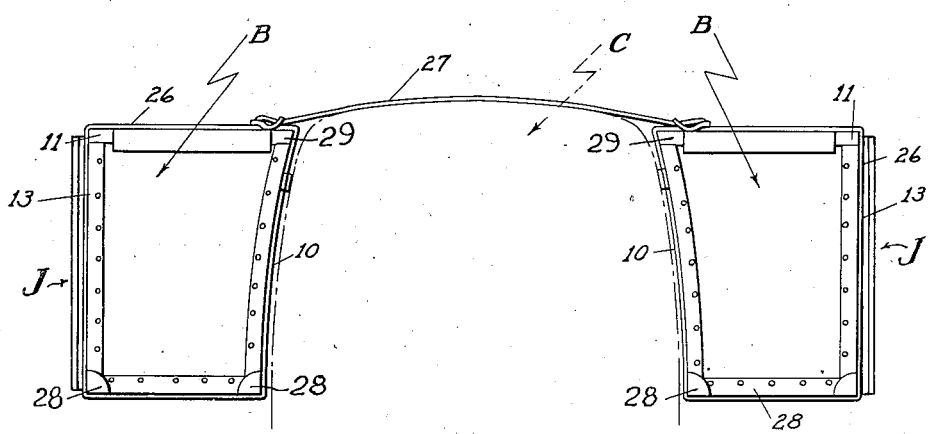
Fig. 1 is an end elevation of transportable work equipment constructed in accordance with this invention, and in position for transportation upon the hood of an automobile.
Figure 2:
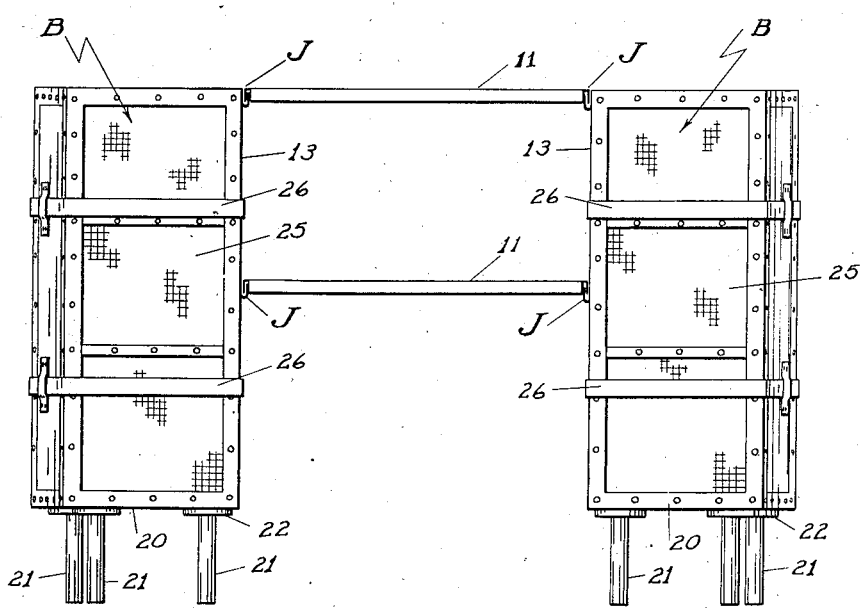
Fig. 2 is a side elevation of the transportable work equipment of Fig. 1, in position for field use showing a screen door 25 attached to a side of each box by means of straps 26.

As illustrated in the drawings, such transportable work equiment may include a pair of boxes or box-like structures B, mounted for transportation on a carrier C, as in Fig. 1, or assembled in field operating position as in Fig. 2, to provide a camp kitchen cabinet or the like, or a desk for clerical or similar work.

Each box B may include a curved side 10 shaped to fit the side of an animal, or the hood of an automobile, as shown. Preferably, one of the boxes is right hand and the other left hand to fit the opposite sides of the body of the carrier. Another side 11 of each box comprises a removable wall, adapted to form a shelf between the two boxes, as in Fig. 2, to provide a structural unit useful as a desk, table, camp cabinet, or the like. A third side 13 is provided with one or more laterally extending connecting elements, adapted to cooperate with connecting elements provided at each end of a removable wall 11, to form a joint J, by which the removable wall is attached to the two boxes. Preferably, a second shelf is provided by attaching the other removable wall 11' at a lower position. Two or more shelves not only provide greater working space, but also act to stabilize the equipment. However, more than one shelf is not always used. For instance, in case a typewriter desk is desired, the upper shelf may be removed to leave only the lower shelf, disposed at the desired height. When the unit is to be used as a field desk, or for other clerical work, the lower shelf may be removed to provide more leg room.

Figure 3:
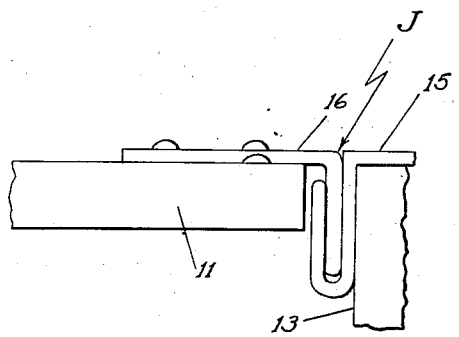
Fig. 3 is an enlarged detail illustrating the construction of a joint forming a part of the equipment.

The joint J, which preferably extends the width of the shelves, may be constructed to give additional stability. As illustrated in Fig. 3, a U-strap 15 may be attached to the upper edge of side 13 of each box, and a flange 16 may be attached to each end of a removable wall 11. The flange fits into the strap in a tongue and groove connection which imparts steadiness to the assembled unit and provides a substantially continuous upper surface. A second U-strap may be attached to wall 13 intermediate its longitudinal edges, for the lower shelf.

Figure 6:
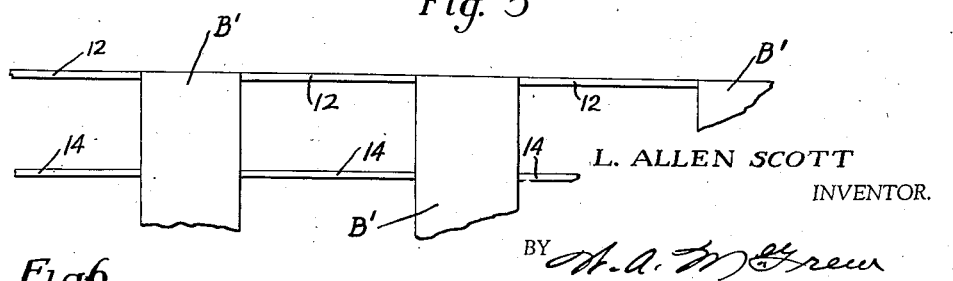
Fig. 6 is a fragmentary diagrammatic elevation, on a reduced scale, of a plurality of units assembled for use.

When a plurality of boxes are placed in spaced alignment, as in Fig. 6, with one or more shelves connecting adjacent boxes B', at least the intermediate boxes should be provided with connecting elements on opposite sides thereof. Such multiple units normally will be shipped by truck or the like, and therefore have straight walls, rather than curved.

Figure 4:
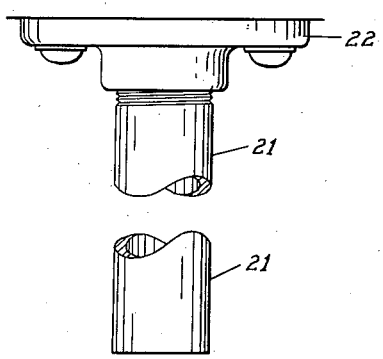
Fig. 4 is an enlarged detail illustrating the construction of a supporting leg.

The interior of each box may be provided with partitions to divide the space into compartments for containing equipment during shipping; to provide shelves when the unit is assembled for use; and also to strengthen the construction. One end 20 of each box may be provided with removable supports, such as pipes 21. The pipes 21, as in Fig. 4, may be screwed into flanges 22 attached to the box, and may be adjusted in length to raise or lower the upper surface of the unit, or level up the top surface when the unit is placed on an uneven support, such as rough ground. For greater adjustability of the pipes, holes may be provided above the flanges so that a pipe may extend into the hole when being adjusted to a shorter length than normal. It will be understood, of course, that the supporting pipes and flanges may be omitted, if desired, and also that the pipes may be removed if an upper working surface of a lower height is desired.

The side from which wall 11 has been removed may be enclosed by a screen door 25, in case food is carried or stored in the boxes. If desired, this door may be held in place by straps 26 which are loosened to permit access to the interior of the box. This door, which may be carried in the box when not in use, has a dimension large enough to completely cover the open side when wall 11 is removed, as will be understood by reference to Fig. 2. Papers, forms, and the like, for clerical work, may be stored and carried in the boxes. A convenient set-up for clerical work is to place a portable typewriter on the lower shelf, so that when typing is to be done, the upper shelf may be removed and the typewriter opened.

Figure 5:
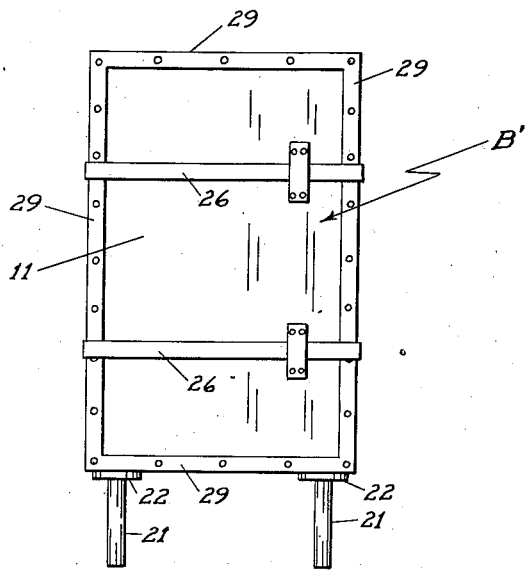
Fig. 5 is a side elevation of one unit of a modification of equipment constructed in accordance with this invention, ready for shipment.

Instead of having a curved side, in case the boxes are to be shipped by truck, they may be rectangular in shape, as box B' of Fig. 5, which is otherwise similar to boxes B. When packing for shipment, the legs may be removed and placed inside the boxes, and the removable walls 11 secured to the boxes by straps 26.

A pair of the boxes may be readily carried by a pack animal, such as a horse, mule or the like, or on any other carrier, such as on the hood of an automobile. When placed on such a carrier, the boxes are preferably disposed longitudinally, the removable sides 11 being at the top. Transporting straps 27 may be provided, adjacent to the ends of the boxes and passing over the top of the hood of the automobile, as shown, or over the back of the animal, as the case may be. The pair of boxes is thus balanced on either side of the carrier, but the boxes may be further secured to the carrier, if desired.

The boxes may be constructed in any suitable manner, and of any suitable material. The sides of the boxes may be made of fiber board, plasticized material, masonite, plywood or the like, preferably reinforced by suitable means, such as metal angles 28 attached to the corners or metal strips 29 attached to the edges of removable walls 11. The angles and strips, as well as straps 15 and flanges 16 may be riveted or secured to the walls in any other suitable manner.

It is to be understood that the term "box" as used herein does not require that the structure have any specific shape, although a substantially rectangular cross section is normally desired for ease in shipment and handling. Thus, the boxes may be square, partially oval, or have any other shape, polygonal or non-polygonal. When the boxes are to be shipped by trucks or rail, the cross section is preferably rectangular for ease in packing.

From the foregoing, it will be apparent that transportable work equipment constructed in accordance with this invention is, when assembled for shipment, relatively compact, but when set up for field use, provides a relatively large amount of working space. Culinary, clerical or other equipment may be carried inside the boxes, and is readily accessible for field use. Also, a very small amount of time is required to remove the walls 11, place the boxes on end, and connect the removable walls between the boxes. While not essential to the invention in its broader scope, the tongue and groove connection described above has particular utility in its ease of attachment and detachment.

It will be understood that the size and shape of the boxes may be varied, that different forms and shapes of removable walls to provide different types of shelves may be used, and that other changes may be made without departing from the spirit and scope of this invention.

What is claimed is:

1. A device of the character described, comprising a pair of end-supported, open-sided boxes arranged in substantially-parallel, spaced relationship, means on each said box at substantially uniform elevations for reception of means on a connecting member, said means on each box comprising a socket member extending a substantial distance along the side of the box, and at least one connecting member bridging the space between the boxes and having means inserted in the respective sockets for maintaining said boxes in substantially non-wabbling relation, the connecting member being of such size and shape as to provide, on removal from said sockets, a closure for the open side of one said box.

2. A device of the character described, comprising a pair of end-supported, open-sided boxes arranged in substantially-parallel, spaced relationship, means on each said box at substantially uniform and spaced elevations for reception of means on a connecting member, said means on each box comprising a socket member extending a substantial distance along the side of the box, and a plurality of connecting members bridging the space between the boxes and having means inserted in the respective sockets for maintaining said boxes in substantially non-wabbling relation, the connecting members being of such size and shape as to provide, on removal from said sockets, closures for the open sides of the respective boxes.

3. A device of the character described, comprising a pair of end-supported, open-sided boxes arranged in substantially-parallel, spaced relationship, one side of each box being shaped to fit a curved body, means on each said box at substantially uniform elevations for reception of means on a connecting member, said means on each box comprising a socket member extending a substantial distance along the side of the box, and at least one connecting member bridging the space between the boxes and having means inserted in the respective sockets for maintaining said boxes in substantially non-wabbling relation, the connecting member being of such size and shape as to provide, on removal from said sockets, a closure for the open side of one said box.

4. A device of the character described, comprising a pair of end-supported, open-sided boxes arranged in substantially-parallel, spaced relationship, one side of each box being shaped to fit a curved body, means on each said box at substantially uniform and spaced elevations for reception of means on a connecting member, said means on each box comprising a socket member extending a substantial distance along the side of the box, and a plurality of connecting members bridging the space between the boxes and having means inserted in the respective sockets for maintaining said boxes in substantially non-wabbling relation, the connecting members being of such size and shape as to provide, on removal from said sockets, closures for the open sides of the respective boxes.

LESTER A. SCOTT.

REFERENCES CITED

The following references are of record in the file of this patent:

UNITED STATES PATENTS

| Number | Name | Date |
| --- | --- | --- |
| 1,892,415 | Ulrich | Dec. 27, 1932 |
| 521,067 | Wood | June 5, 1894 |
| 962,544 | Anderson | June 28, 1910 |
| 1,539,112 | Gloekler | May 26, 1925 |

FOREIGN PATENTS

| Number | Country | Date |
| --- | --- | --- |
| 109,215 | England | Sept. 6, 1917 |